United States Patent Office 3,300,453
Patented Jan. 24, 1967

3,300,453
INTERPOLYMERS COMPRISING ACRYLONITRILE AND CYANOALLYLOXYBENZENESULFONIC ACID OR ITS SALTS
James C. Masson, Chapel Hill, N.C., assignor to Monsanto Company, a corporation of Delaware
No Drawing. Filed July 30, 1964, Ser. No. 386,374
4 Claims. (Cl. 260—79.3)

This invention relates to novel acrylonitrile polymers having improved basic dye acceptance. The invention further relates to novel processes for improving the basic dye acceptance of acrylonitrile polymers.

Various means have been employed in the art to improve the basic dye acceptance of acrylic and modacrylic polymers. One such means involves polymerization through the use of an initiator such as the persulfate-bisulfite redox system. The use of the system inherently provides polymers having —OSO₃M and —SO₃M end groups as described in U.S. Patent 3,123,588. These groups enhance the ability of the polymer to take on a basic dye. A particular limitation of this type of increased dye acceptance is that adequate concentrations of the dye receptive groups are present only in polymers of relatively low molecular weight and where the polymer is to be used to produce fibers, films and filaments, for example, higher molecular weights are desirable to optimize the properties of the manufactured article. Accordingly, there is a need for other means by which the basic dyeability of acrylonitrile polymers can be increased, even where redox initiator systems are employed to prepare the polymers.

It is, therefore, an object of this invention to provide a means for increasing the basic dye acceptability of acrylonitrile polymers.

It is a further object of this invention to provide novel acrylonitrile polymers which may be used alone or blended with other polymers to provide fibers, films and filaments having improved basic dye acceptability.

These and other objects will become apparent from the ensuing description of the invention.

The objects of this invention are accomplished by the polymerization of acrylonitrile in the presence of β-cyanoallyloxybenzenesulfonic acid or alkali metal salts thereof having the formula:

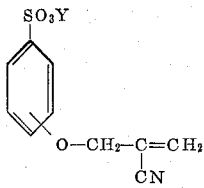

wherein Y is H or an alkali metal. Examples of the basic dye receptive monomers are β-cyanoallyloxybenzenesulfonic acid, and potassium β-cyanoallyloxybenzenesulfonate and the like. The compounds may be formed by reacting an alkali metal salt of a phenol sulfonic acid with a β-cyanoallyl halide in the presence of a base. The free acid may be isolated by passing the salt form of the ether through a cation exchange resin in the hydrogen form.

In the polymerization process of this invention the acid monomers are randomly incorporated in the polymer chain as comonomers in small amounts to provide acrylonitrile polymers which are more readily dyed with basic dyes. Incorporation of the monomer may be varied over a wide range, the selection of particular concentrations being dependent upon the degree of increased dyeability desired. Normally concentrations of the acid monomer range from about 0.25 percent to about 10 percent based on the total monomer weight. Preferably the acid monomer is incorporated in concentrations ranging from about 0.3 percent to about 1 percent.

The β-cyanoallyloxybenzenesulfonic acid and salts of this invention may be polymerized with acrylonitrile and one or more monomers to provide terpolymers and tetrapolymers. The dye receptive terpolymers and tetrapolymers may be used alone or in combination with other acrylonitrile containing polymers to provide basic dye receptive polymer blends. While the preferred polymers of the instant invention are those containing at least 80 percent of acrylonitrile, generally recognized as the fiber-forming acrylonitrile polymers, it will be understood that the invention is likewise applicable to polymers containing less than 80 percent acrylonitrile wherein similar improvements in basic dyeability are realized through incorporation of the dye receptive monomer defined herein. The acrylonitrile polymers containing less than 80 percent acrylonitrile are useful in forming films, coating compositions, molding operation, lacquers, etc., by means known to those skilled in the art.

For example, the polymer may be a terpolymer of from 80 to 98 percent acrylonitrile, from 0.5 to 2 percent of the acid monomer or salt and up to 19.5 percent of another aliphatic or alicyclic monomer containing the

linkage and copolymerizable with acrylonitrile. Suitable mono-olefinic monomers include the acrylates, such as methyl methacrylate, ethyl methacrylate, butyl methacrylate, methoxymethyl methacrylate, β-chloroethyl methacrylate, and the corresponding esters of acrylic and α-chloroacrylic acids; vinyl chloride, vinyl bromide, vinylidene chloride, 1-chloro-1-bromoethylene; methacrylonitrile, acrylamide and methacrylamide; α-chloroacrylamide, or monoalkyl substitution products thereof; methyl vinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; N-vinyl carbazole, vinyl furane; alkyl vinyl esters; diethylcitraconate, diethylmesaconate, dimethylmesaconate, styrene, vinyl naphthalene; vinyl-substituted tertiary heterocyclic amines, such as the vinylpyridines and alkyl-substituted vinyl pyridines, for example, 2-vinylpyridine, 4-vinylpyridine, 2-methyl-5-vinylpyridine, etc.; 1-vinylimidazole and alkyl-substituted 1-vinylimidazoles, such as 2-, 4-, or 5-methyl-1-vinylimidazole, and other

containing polymerizable materials known to those skilled in the art.

The polymer may be a tetrapolymer, for example, products obtained by the interpolymerization of acrylonitrile and two or more of the above described monomers with the acid monomer of this invention. More specifically, and preferably, the tetrapolymer comprises acrylonitrile, vinylacetate, vinylidine chloride or vinyl chloride and the acid monomer. The tetrapolymers preferably contain from 80 to 97 percent of acrylonitrile, from 1 to 10 percent of a vinyl acetate and from 1 to 18 percent of another substance, such as methacrylonitrile, vinylidene chloride or vinyl chloride with a suitable amount of β-cyanoallyloxybenzenesulfonate.

The polymer may also be a blend of polyacrylonitrile or of a binary interpolymer of from 80 to 99 percent acrylonitrile and from 1 to 20 percent of at least one other

containing substance with from 2 to 50 percent of the weight of the blend of a copolymer of from 10 to 70 percent of acrylonitrile and from 30 to 90 percent of at least one other

containing polymerizable monomer. Preferably, when the polymeric material comprises a blend, it will be a blend of a terpolymer of 90 to 98 percent acrylonitrile, from 2 to 9 percent of another mono-olefinic monomer, such as vinyl acetate, which is not receptive to dyestuff, and up to 4 percent of a described acidic monomer with a sufficient amount of a copolymer of from 90–98 percent of acrylonitrile and from 10 to 2 percent of a vinyl monomer such as vinyl acetate, methyl methacrylate, vinyl chloride, vinylidene chloride or styrene.

The acrylonitrile polymer compositions defined herein which contain the dye receptive monomer of this invention in the polymer chain show a substantial improvement in basic dyeability. This invention makes possible relatively large improvements in basic dye acceptance of acrylonitrile polymer compositions, such improvements being attained with minute amounts of acid monomer. The monomer employed is fairly inexpensive and its use does not require change of existing methods for preparing acrylonitrile polymer compositions.

These polymers may be converted to articles of manufacture by well known conventional methods, for example, the wet-spinning and dry-spinning methods for the production of filaments and fibers. The fibers and filaments prepared in this manner will be found to have greatly improved affinity for basic dyes. If desirable, various additives such as light stabilizers, antistatic agents, and the like may be added to the compositions of the invention by any convenient means.

The polymers just described may be prepared by any conventional polymerization procedure, such as mass polymerization methods, solution polymerization methods, or aqueous emulsion methods. The polymerization is normally catalyzed by known catalysts and is carried out in equipment generally used in the art. However, the preferred practice utilizes suspension polymerization wherein the polymer is prepared in finely divided form for immediate use in a filament forming operations. The preferred suspension polymerization involves batch procedures, wherein monomers are charged with an aqueous medium containing the necessary catalyst. A more desirable method involves the semi-continuous procedure in which the polymerization reactor containing the aqueous medium is charged with the desired monomers gradually throughout the course of the reaction. Entirely continuous methods involving the gradual addition of monomers and the continuous withdrawal of polymer can also be employed.

The polymerization may be catalyzed by means of water-soluble salts of peroxy acids, sodium peroxide, hydrogen peroxide, sodium perborate, the sodium salts of other peroxy acids, and other water-soluble compounds containing the peroxy groups (—O—O—)

A wide variation in the quantity of peroxy compound is possible. For example, from 0.1 to 3.0 percent by weight of the polymerizable monomers may be used. The so-called redox catalyst system is preferred in the process of this invention. Redox agents are generally compounds in a lower valent state which are readily oxidized to the higher valent state under the conditions of reaction. Through the use of this reduction oxidation system, it is possible to obtain polymerization to a substantial extent at lower temperatures than otherwise would be required. Suitable "redox" agents are sulfur dioxide, the alkali metal and ammonium bisulfites, and sodium formaldehyde sulfoxylate. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in regard to its chemical and physical properties.

In order to further illustrate the present invention and the advantages thereof, the following specific examples are given, it being understood that they are merely intended to be illustrative. In the examples, all parts and percents are by weight unless otherwise indicated. The basic dye acceptance (BDA) of the acrylonitrile polymer compositions of this invention was measured using a procedure involving "Sevron Blue 2G" dye (C.I. Basic Blue 22). The procedure consists of mixing a buffered (pH 5.4) solution of the dye with the polymer in a sealed tube at 100° C. for 2 hours. A 40 to 1 liquor:polymer ratio was used. After filtering and washing, the filtrate was analyzed spectrophotometrically to determine the amount of dye remaining and from this the percentage of dye take-up is determined. This is referred to as the basic dye acceptance.

*Example I*

In this example a semi-batch polymerization process was employed with the addition of monomer and initiator taking place over a two hour period. The polymerization vessel was maintained at 50° C. and was purged with nitrogen before and throughout the polymerization. To the polymerization vessel 500 parts of water, 90 parts of acrylonitrile, 9 parts of vinyl acetate, 1 part of sodium p-(β-cyanoallyloxy) benzenesulfonate, 2 parts potassium persulfate and 2 parts of sulfur dioxide (added as sodium bisulfite) were mixed together. At the end of the polymerization reaction, a white polymer was obtained in 87 percent yield, having a normal specific viscosity ($\eta$sp.) determined on a 0.1 percent solution in dimethylformamide at 25° C. of 0.15. This polymer was subjected to the basic dye acceptance test and a dye acceptance of 20.6 percent resulted. The dye acceptance of a control polymer where the novel monomer of this invention is excluded is about 12.6 percent.

*Example II*

A continuous polymerization process was used in this example. The polymerization vessel was charged with 450 parts of water, 90.5 parts acrylonitrile, 9 parts vinyl acetate, 0.5 part of sodium p-(β-cyanoallyloxy) benzenesulfonate, 0.55 part potassium persulfate, 2.75 parts sulfur dioxide. The average dwell time was 60 minutes, and the polymerization temperature 40° C. A 63 percent yield of white polymer of 0.185 $\eta$sp. was obtained. Basic dye acceptance of this polymer was 14.2 percent. A polymer prepared by the same method wherein the β-cyanoallyloxybenzenesulfonate is not used exhibits a dye acceptance of 9.3 percent.

From the above examples it can readily be seen that the incorporation of minute amounts of β-cyanoallyloxybenzenesulfonate increases the dye acceptance.

I claim:

1. A random interpolymer comprising at least about 80 percent by weight of acrylonitrile and up to about 20 percent by weight of a different copolymerizable monomer containing the aliphatic radical

and having from about 0.25 percent to about 10 percent by weight of the monomer having the formula

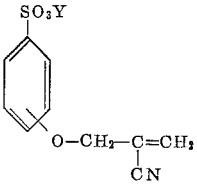

wherein Y is a cation selected from the group consisting of H and an alkali metal incorporated in the polymer chain.

2. A random interpolymer comprising at least 90 percent by weight of acrylonitrile and up to about 10 percent by weight of vinyl acetate and from about 0.25 percent to about 2 percent of an alkali metal β-cyanoallyloxybenzenesulfonate.

3. A polymer of claim 2 wherein the alkali metal is sodium.

4. A random ternary polymer which comprises acrylonitrile, vinyl acetate and sodium β-cyanoallyloxybenzenesulfonate in a weight ratio of about 90.5:9:0.5.

References Cited by the Examiner

UNITED STATES PATENTS

| | | | |
|---|---|---|---|
| 2,808,396 | 10/1957 | Hill | 260—79.3 |
| 3,123,588 | 3/1964 | Lunney | 260—79.3 |
| 3,202,640 | 8/1965 | Taniyama et al. | 260—79.3 |

JOSEPH L. SCHOFER, *Primary Examiner.*

W. HOOVER, *Assistant Examiner.*